(12) United States Patent
Persiani et al.

(10) Patent No.: US 10,173,523 B2
(45) Date of Patent: Jan. 8, 2019

(54) MOUTHPIECE ASSEMBLY OF A FUEL TANK FOR VEHICLES WITH TIGHT CLOSING DEVICE

(71) Applicant: CEBI ITALY S.P.A., Dronero (CN) (IT)

(72) Inventors: Luigi Persiani, Osimo (IT); Marco Scocco, Recanati (IT)

(73) Assignee: CEBI ITALY S.P.A., Dronero (CN) (IT)

( * ) Notice: Subject to any disclaimer, the term of this patent is extended or adjusted under 35 U.S.C. 154(b) by 224 days.

(21) Appl. No.: 15/389,653

(22) Filed: Dec. 23, 2016

(65) Prior Publication Data

US 2017/0182882 A1   Jun. 29, 2017

(30) Foreign Application Priority Data

Dec. 29, 2015  (IT) .................. 102015000088761

(51) Int. Cl.
| | | |
|---|---|---|
| *B60K 15/05* | (2006.01) | |
| *E05B 83/34* | (2014.01) | |
| *F16H 21/44* | (2006.01) | |
| *E06B 3/36* | (2006.01) | |
| *F16H 25/18* | (2006.01) | |
| *F16H 37/12* | (2006.01) | |

(52) U.S. Cl.
CPC .............. *B60K 15/05* (2013.01); *E05B 83/34* (2013.01); *E06B 3/36* (2013.01); *F16H 21/44* (2013.01); *F16H 25/18* (2013.01); *F16H 37/12* (2013.01); *B60K 2015/053* (2013.01); *B60K 2015/0576* (2013.01); *B60K 2015/0584* (2013.01)

(58) Field of Classification Search
CPC .............. B60K 15/05; B60K 2015/053; B60K 2015/0561; B60K 2015/0576; B60K 2015/0584; E05B 83/34; F16H 21/44; F16H 25/18; F16H 37/12
USPC ....................................... 296/97.22
See application file for complete search history.

(56) References Cited

U.S. PATENT DOCUMENTS

| | | | |
|---|---|---|---|
| 8,845,001 B2 * | 9/2014 | Kotama | .............. B60L 11/1818 296/97.22 |
| 2014/0042768 A1 * | 2/2014 | Watanabe | .............. B60K 15/05 296/97.22 |
| 2014/0283636 A1 * | 9/2014 | Frommann | ............. F16H 21/44 74/110 |

(Continued)

FOREIGN PATENT DOCUMENTS

| | | |
|---|---|---|
| DE | 102011012699 A1 | 9/2012 |
| EP | 1295748 A2 | 3/2003 |

*Primary Examiner* — Gregory A Blankenship
(74) *Attorney, Agent, or Firm* — Egbert Law Offices, PLLC (57) ABSTRACT

A mouthpiece assembly of a fuel tank for vehicles has a box defining a recessed housing wherein a hole is obtained to access a duct leading to the fuel tank of the vehicle, a lid hinged to the box, and a closing device having a translating pin translatingly mounted, a cap disposed on the translating pin, and a push-push lock mechanism connected to the translating pin. The upper part of the translating pin has a plurality of longitudinal tabs that are elastically flexible outwards in such manner to deform the cap, forming a collar that protrudes outwards and is engaged tightly inside the seat of the lid of the fuel tank in order to hold the lid of the fuel tank in closed position.

10 Claims, 7 Drawing Sheets

(56) References Cited

U.S. PATENT DOCUMENTS

| | | | |
|---|---|---|---|
| 2014/0291996 A1* | 10/2014 | Basavarajappa | B60K 15/05 292/61 |
| 2015/0008685 A1* | 1/2015 | Beck | B60K 15/05 292/336.3 |
| 2015/0224872 A1* | 8/2015 | Frommann | B60K 15/05 296/97.22 |
| 2016/0326780 A1* | 11/2016 | Watanabe | E05B 83/34 |
| 2016/0348408 A1* | 12/2016 | Watanabe | B60K 15/05 |
| 2017/0043660 A1* | 2/2017 | Horikawa | B60K 15/05 |
| 2017/0182882 A1* | 6/2017 | Persiani | B60K 15/05 |
| 2018/0170176 A1* | 6/2018 | Yang | B60K 15/05 |
| 2018/0266151 A1* | 9/2018 | Sonobe | B60K 15/05 |

* cited by examiner

MOUTHPIECE ASSEMBLY OF A FUEL TANK FOR VEHICLES WITH TIGHT CLOSING DEVICE

CROSS-REFERENCE TO RELATED U.S. APPLICATIONS

Not applicable.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO AN APPENDIX SUBMITTED ON COMPACT DISC

Not applicable.

BACKGROUND OF THE INVENTION

1. Field of the Invention

The present patent application for industrial invention relates to a mouthpiece assembly of a fuel tank for vehicles with tight closing device.

2. Description of Related Art Including Information Disclosed Under 37 CFR 1.97 and 37 CFR 1.98.

Various types of closing devices are known, which are mounted in the mouthpiece of a fuel tank of a vehicle to close the lid of the fuel tank.

The EP1295748 patent application in the name of Volkswagen discloses a closure mechanism of the fuel tank lid comprising a rototranslating pin with a "T-shaped" head in axial section, which is engaged in a slot or eyelet obtained in a seat of a fuel tank lid in such a way to close the fuel tank safely. Such a solution is inexpensive and not cumbersome because only one mechanism and one actuator to control the movement of the rototranslating pin are necessary. However, such a closing device is impaired by some drawbacks in terms of water sealing. In fact, the coupling between the rototranslating pin and the slot of the lid has a clearance. Consequently, while the vehicle is traveling, the fuel tank lid will move due to the vibrations of the vehicle body and water will tend to enter the mouth of the fuel tank from the outside. In such a case, seal gaskets can be applied on the rototranslating pin. In fact, considering that the rototranslating pin makes a rotation in addition to a translation, such a rototranslating pin would tear any seal gaskets applied thereon.

The DE102011012699 patent application in the name of Daimler and Hella discloses a locking device of the fuel tank that comprises a translating pin of push-push type that is engaged in a seat of the fuel lid. In this case, in view of the fact that the pin does not rotate, a seal gasket can be applied on the translating pin, in such a way to provide a tight coupling without clearance with the seat of the lid. However, considering that the pin only makes a translation, such a pin cannot close the lid safely. Consequently, an additional safety system is necessary, which is composed of a hook that closes the fuel lid safely.

Therefore such a solution is impaired by some drawbacks in terms of costs and volume because a second mechanism and actuator are necessary to actuate the hook, in addition to the mechanism and the actuator of the pin.

The purpose of the present invention is to eliminate the drawbacks of the prior art, by disclosing a mouthpiece assembly of a fuel tank for vehicles with a tight closing device that is capable of providing an effective, tight closing for the water coming from outside.

Another purpose of the present invention is to disclose a mouthpiece assembly for a fuel tank for vehicles with a tight closing device that is versatile, reliable, inexpensive, not cumbersome and simple to make and install.

BRIEF SUMMARY OF THE INVENTION

These purposes are achieved by the present invention with the characteristics of the independent claim 1.

Advantageous embodiments appear from the dependent claims.

The mouthpiece assembly of a fuel tank for vehicles according to the invention comprises:
- a box defining a recessed housing wherein a hole is obtained to access a duct leading to the fuel tank of the vehicle,
- a lid hinged to the box in such manner to close the recessed housing of the box, said lid being provided with a closing seat, and
- a closing device disposed in the recessed housing of the box of the mouthpiece assembly.

The closing device comprises:
- a translating pin translatingly mounted in a box and having an upper portion that cooperates with the closing seat of the lid in such manner to hold the lid in closed position,
- a cap made of a soft elastic material disposed above said upper portion of the translating pin to provide tightness with the closing seat of the lid, and
- a push-push lock mechanism connected to the translating pin.

The upper part of the translating pin comprises a plurality of longitudinal tabs that are elastically flexible outwards in such manner to deform said cap, forming a collar that protrudes outwards and is engaged tightly inside said seat of the lid of the fuel tank in order to hold the lid of the fuel tank in closed position.

The advantages of the mouthpiece assembly of the invention are evident. The fact that the pin only translates, without rotating, prevents damaging the cap disposed on the translating pin.

The elastic outward bending of the longitudinal tabs of the translating pin forms a collar that protrudes outwards in the cap and provides coupling without clearance between the upper part of the translating pin and the seat of the fuel tank lid, thus avoiding any undesired movements of the lid and therefore preventing water from penetrating from outside into the recessed housing of the mouth of the fuel tank.

BRIEF DESCRIPTION OF THE SEVERAL VIEWS OF THE DRAWINGS

Additional features of the invention will appear manifest from the detailed description below, which refers to a merely illustrative, not limiting embodiment, as illustrated in the attached figures, wherein.

DETAILED DESCRIPTION OF THE INVENTION

With reference to the figures, the mouthpiece assembly according to the invention is disclosed, which is generally indicated with reference numeral (100).

Figure 1:
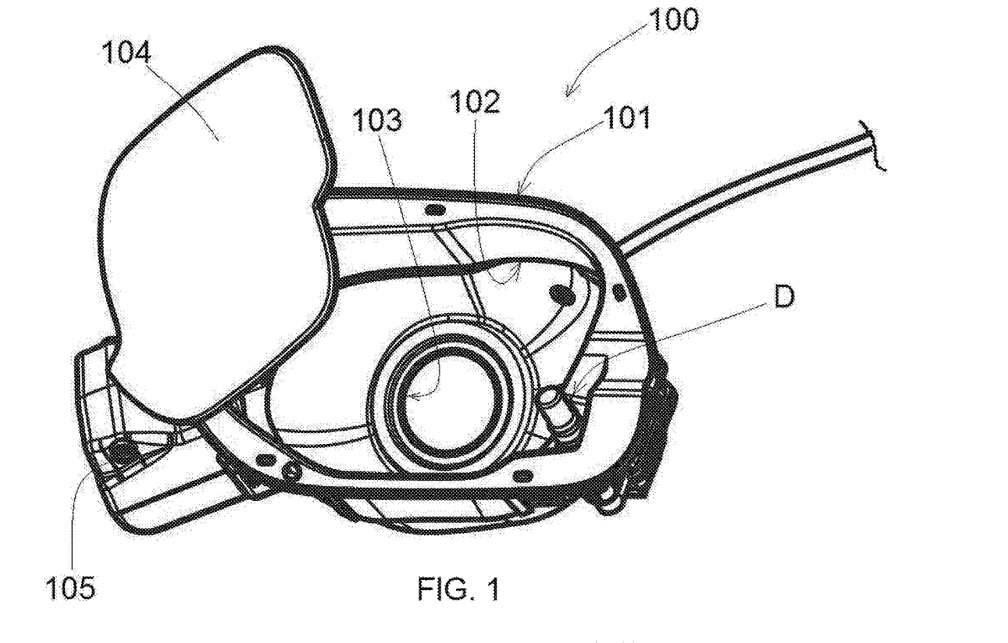
FIG. 1 is an axonometric view of the mouthpiece assembly of a fuel tank according to the invention.
Figure 1A:
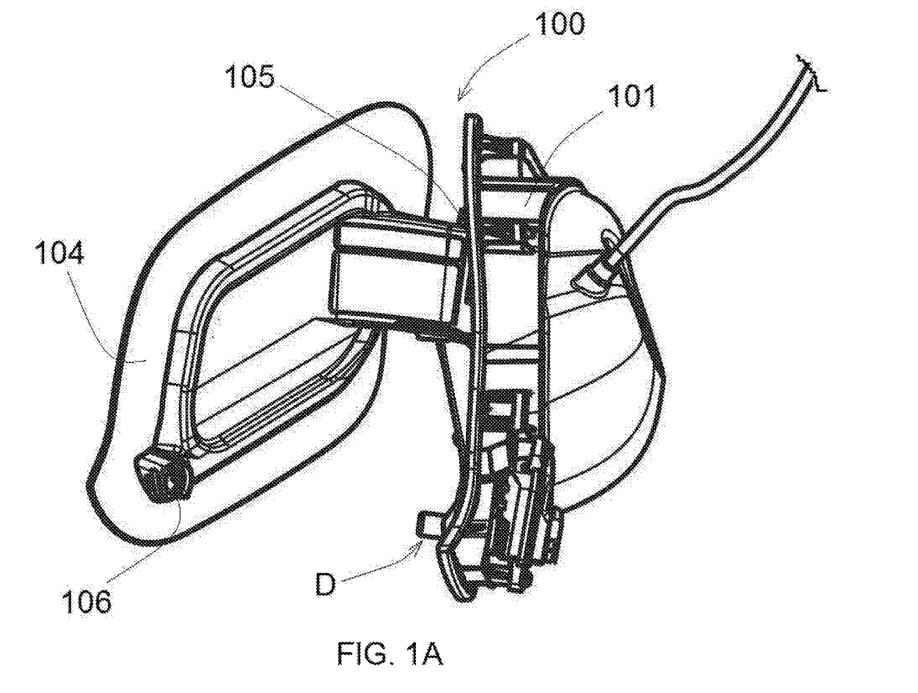
FIG. 1A is an axonometric view of the mouthpiece assembly seen from a different angle compared to FIG. 1.

With reference to FIGS. 1 and 1A, the assembly (100) comprises a box (101) defining a recessed housing (102) wherein a hole (103) is obtained to access a duct leading to the fuel tank of the vehicle, The hole (103) is intended to receive the tip of a gun of a fuel pump for fueling.

A lid (104) is hinged to the box (101) with a hinge (105) in such manner to close the recessed housing (102) of the box.

A closing device (D) is mounted inside the recessed housing (102) of the box, and cooperates with a closing seat (106) obtained in the lid (104) in such manner to hold the lid (104) in closed position, preventing it from accidentally opening.

Figure 2:
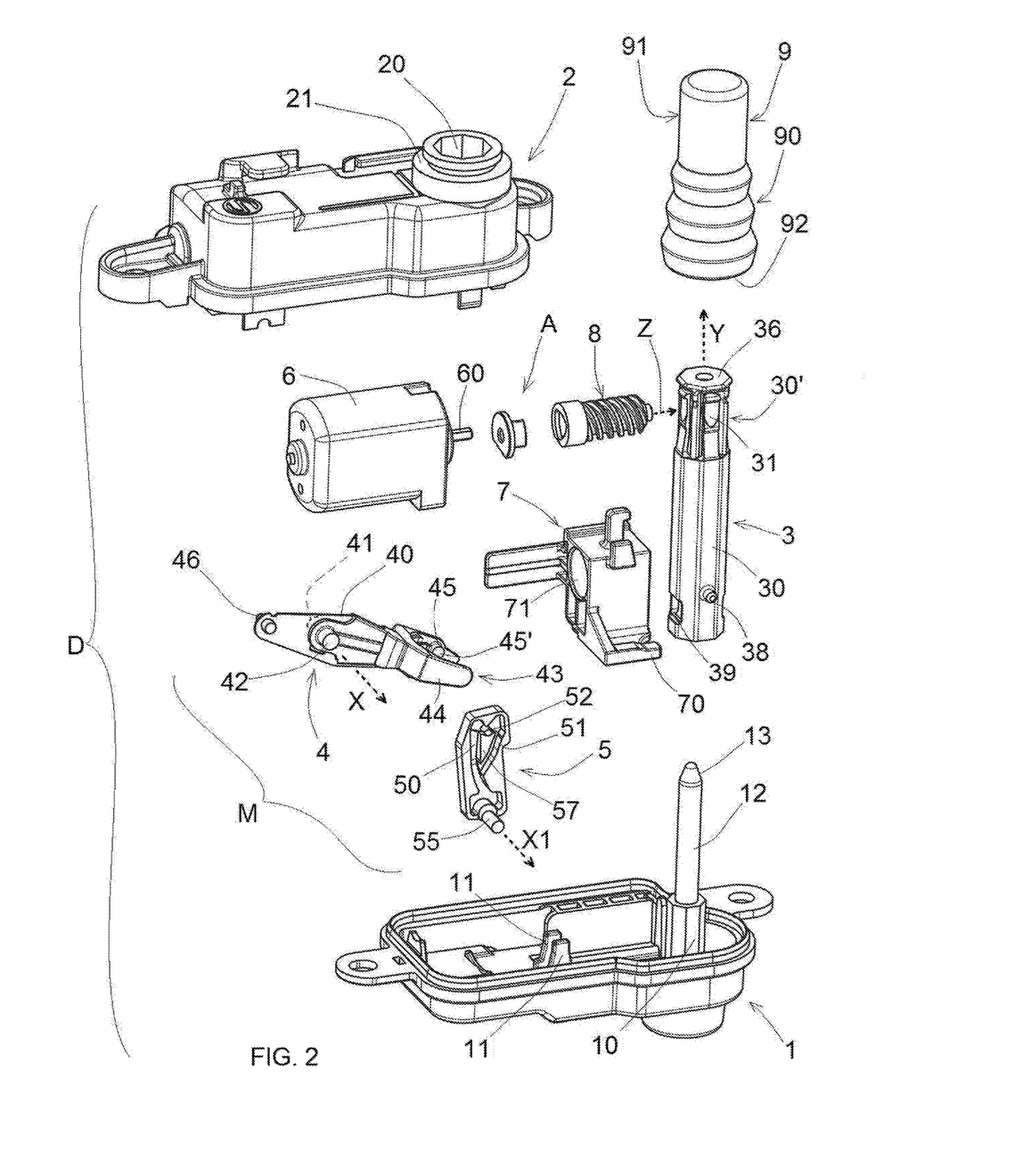
FIG. 2 is an exploded axonometric view of the various elements of the closing device of the mouthpiece assembly of FIG. 1.
Figure 3:
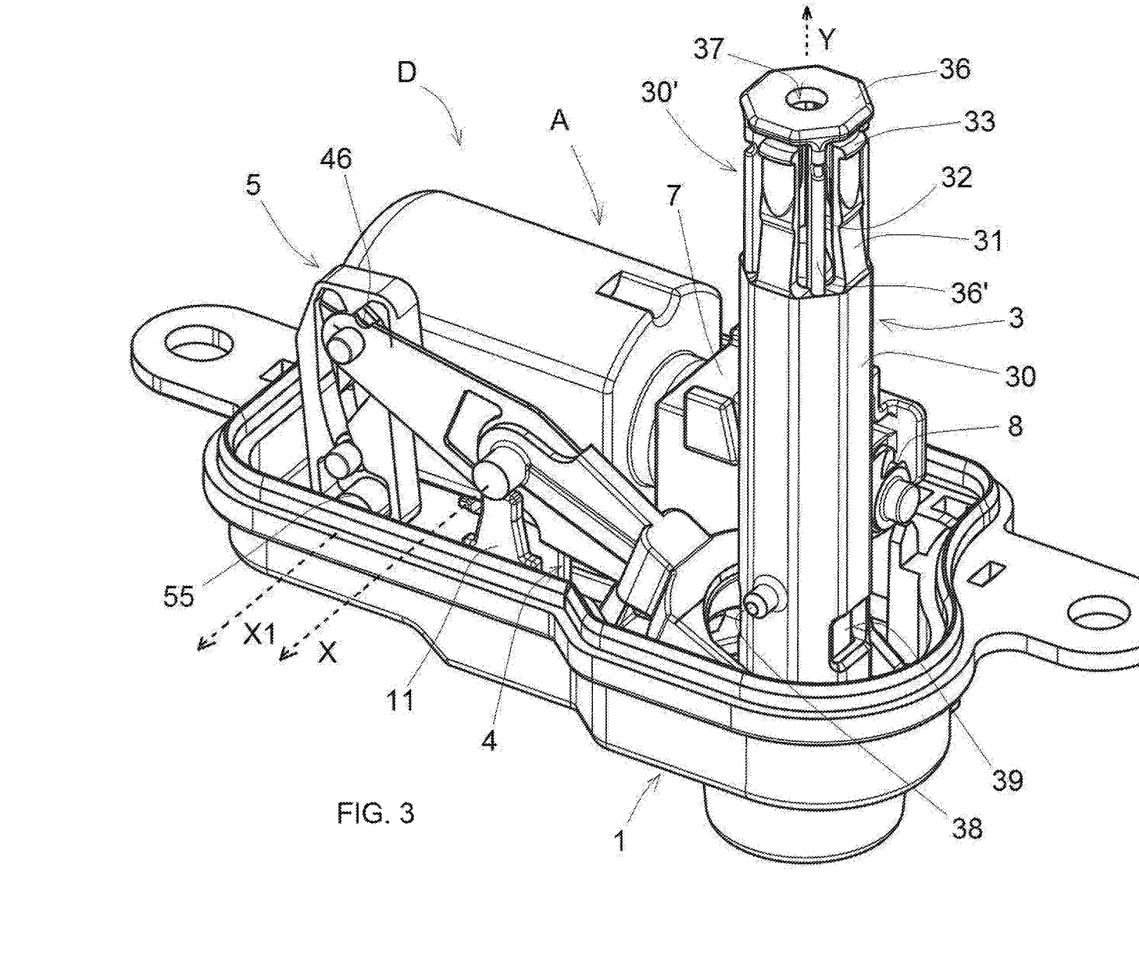
FIG. 3 is an axonometric view of the closing device of FIG. 2 in assembled condition without lid.

With reference to FIGS. 2 and 3, the closing device (D) comprises a box (1) closed by a lid (2). The box (1) houses a "push-push" lock mechanism (M) connected to a translating pin (3) that cooperates with the closing seat (106) of the lid. In order to close the lid (104), the lid is moved towards the translating pin (3) to push the translating pin (first push) and lock it in closing position; in order to open the lid, the lid is moved again towards the translating pin to additionally push the translating pin (second push) in order to unlock it.

The translating pin (3) is slidingly mounted on a shank (10) that stands out from the bottom of the box (1). In this way the translating pin (3) can translate along an axis (Y). The translating pin (3) has a body (30) and an upper portion (30') that protrudes from a hole (20) of the lid (2) to engage with the closing seat (106) of the lid (104). The upper portion (30') of the translating pin remains always outside the lid (2) during the translation of the translating pin (3).

The body (30) of the translating pin (3) has a tubular shape with octagonal cross-section. The body (30) of the translating pin is internally hollow and has an axial octagonal channel (34) (see FIG. 5). In order to prevent a rotation of the translating pin (3), also the hole (20) of the lid is octagonal and also the shank (10) of the box of the closing device has an octagonal cross-section. Evidently, in order to prevent the translating pin (3) from rotating, the body (30) of the pin, the shank (10) of the box and the hole (20) of the lid can have other shapes, such as for example an hexagonal shape, a square shape, a grooved shape and the like.

Figure 5:
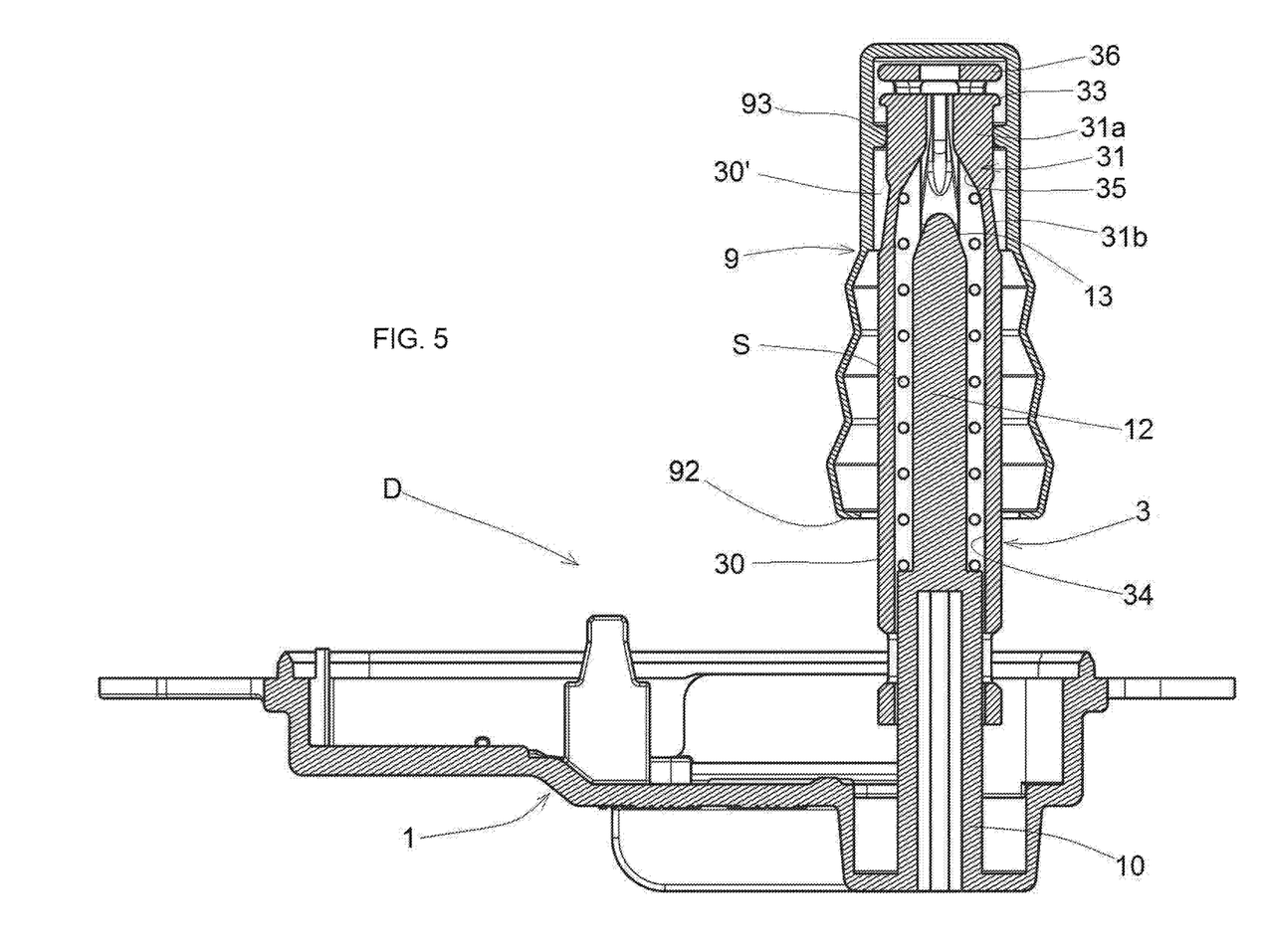
FIG. 5 is an axial sectional view of the closing device of FIG. 4 without lid.

The translating pin (3) is subject to the thrust of an ejection spring (S) (FIGS. 5 and 7) disposed on the shank (10), inside the axial channel (34) of the translating pin to push the translating pin (3) to an extracted opening position (FIG. 5).

The upper portion (30') of the translating pin provides for a plurality of longitudinal tabs (31) that can elastically flexible outwards. Each longitudinal tab (31) is obtained a "U"-shaped notch (32) that surrounds the edges of the tab. For illustrative purpose, four longitudinal equidistant tabs (31) are provided. Each longitudinal tab (31) has a retention tooth (33) that protrudes outwards from the tab.

With reference to FIG. 5, each longitudinal tab (31) has a tapered internal surface (35) that gradually gets away from the translating pin, going from up downwards. Each longitudinal tab (31) has a upper part (31a) and a lower part (31b). The thickness of the upper part (31a) of the longitudinal tab is higher than the thickness of the lower part (31b) of the tab.

The translating pin (3) has a head (36) shaped as an octagonal plate, joined with the body (30) by means of longitudinal columns (36') disposed between the longitudinal tabs (31). The head (36) of the translating pin has a central hole (37).

Two pins (83) radially protrude outwards from the body (30) of the translating pin. The pins (83) are disposed in diametrally opposite positions and are used to fasten the rocker arm (4).

Two slots (39) are obtained in a lower wall of the body (30) of the translating pin. The slots (39) are disposed in diametrally opposite directions.

A stem (12) is disposed on the shank (10) of the box and inserted inside the axial channel (34) of the translating pin. The stem (12) has a tapered upper part (13) with truncated-conical shape, which is disposed under the internal tapered surface (35) of the longitudinal tabs when the translating pin (3) is in extracted opening position (FIG. 5).

The closing device (D) also comprises a cap (9) with a tubular shape open on the bottom and closed on the top. The cap (9) is disposed on the top (30') of the translating pin in such manner to cover the longitudinal tabs (31). The cap (9) is made of a soft elastic material, such as for example synthetic rubber, neoprene, silicone and the like.

Figure 4:
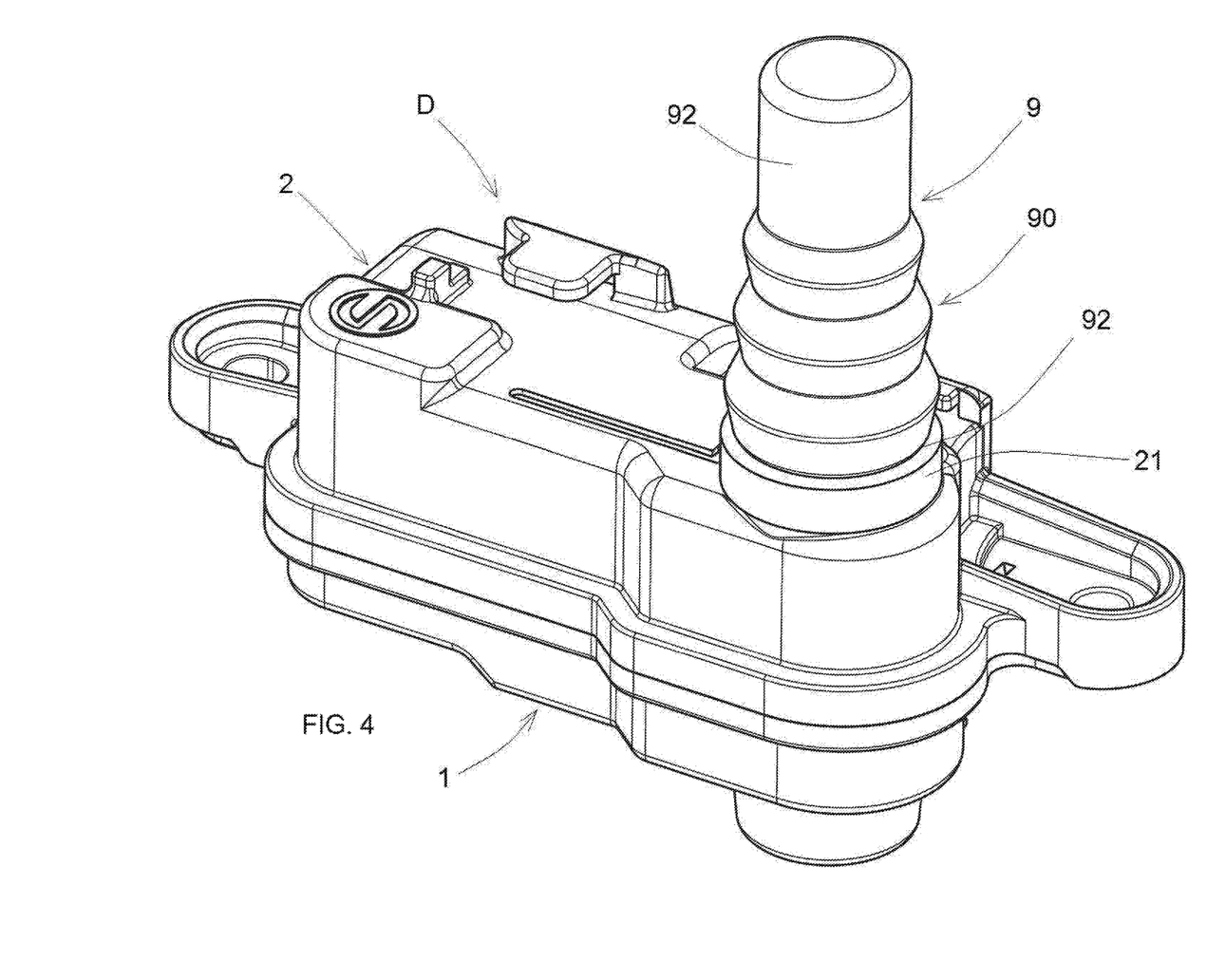
FIG. 4 is an axonometric view of the closing device in open position.

The cap (9) has a bellows-shaped lower portion (90) and a cylindrical upper portion (91). The bellows-shaped lower portion (90) has a lower border (92) that is engaged on a shank (21) of the lid disposed around the hole (20) from which the translating pin (3) comes out. By extending and compressing the bellows-shaped portion (90), the cap (9) can pass from an extended position (FIG. 4), wherein the translating pin is in extracted opening position, to a shortened position (FIG. 5), wherein the translating pin is in retracted closing position.

With reference to FIG. 5, the cap (9) has a collar (93) that protrudes inwards and is disposed in contact with the longitudinal tabs (31) of the translating pin, under the retention teeth (33) of the longitudinal tabs.

Figure 7:
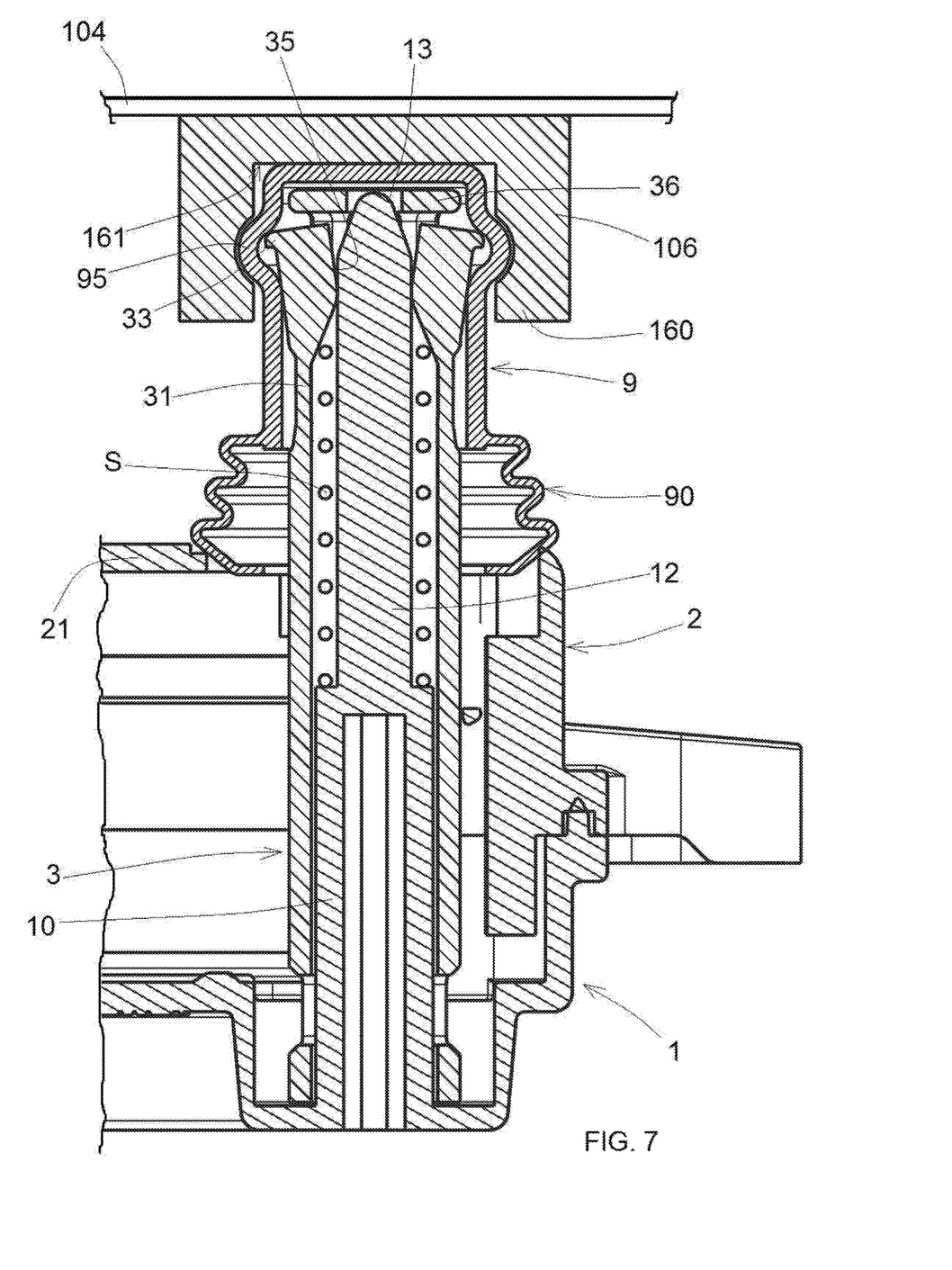
FIG. 7 is an axial sectional view of the closing device of FIG. 6, wherein a portion of the fuel tank lid is added.

With reference to FIG. 7, the closing seat (106) of the lid (104) has a collar (160) that protrudes inwards and a bottom (161).

Initially the translating pin (3) is in extracted position (FIG. 5), the longitudinal tabs (31) are retracted inwards and the spring (S) is unloaded. After closing the lid (104), the head (36) of the translating pin penetrates the closing seat (106) of the lid and the collar (160) of the closing seat of the lid overtakes the retention teeth (33) of the longitudinal tabs of the translating pin because the longitudinal tabs are retracted inwards.

During the movement of the lid (104), the bottom (161) of the closing seat of the lid is stopped against the upper part of the cap (9) above the head (36) of the translating pin and pushes the translating pin (3) downwards, compressing the spring (S). Consequently, the tapered internal surface (35) of the longitudinal tabs (31) of the translating pin slides on the tapered upper surface (13) of the stem (12) that stands up from the shank (10) of the box. Consequently, the longitudinal tabs (31) of the translating pin are elastically bent outwards. Therefore the retention teeth (33) of the longitudinal tabs, which are situated in the closing seat (106) of the lid, interfere with the collar (160) of the closing seat in such manner to prevent the lid from opening. In this closing position, the push-push-lock mechanism (M) locks the extraction of the translating pin (3) to hold it in retracted closing position against the thrust of the spring (S).

Figure 6:
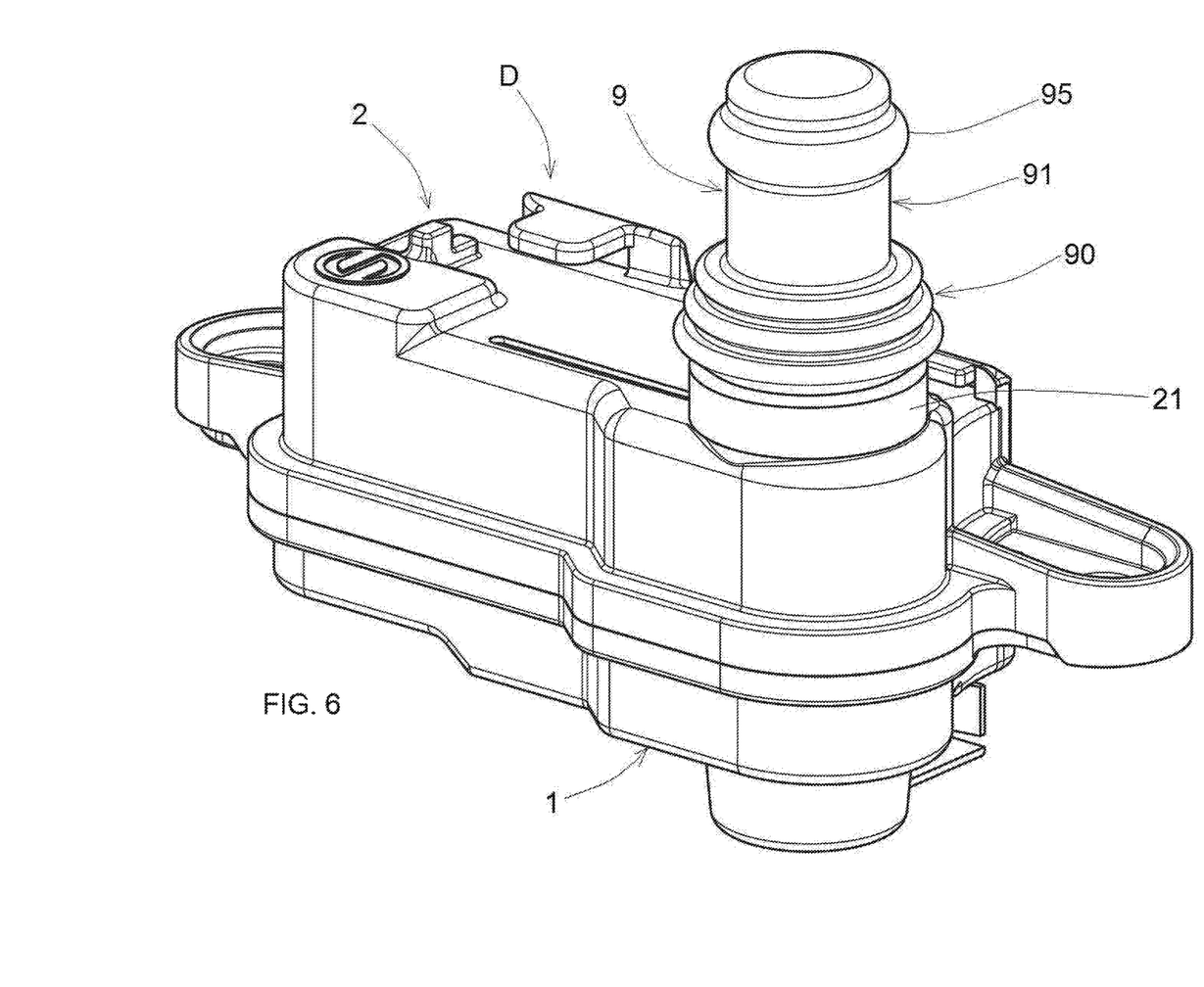
FIG. 6 is an axonometric view of the closing device in closed position.

As clearly shown in FIG. 6, when the translating pin (3) is in retracted closing position, the upper part (91) of the cap forms a collar (95) that protrudes outwards because of the expansion of the cap imposed by the retention teeth (33) of the longitudinal tabs of the translating pin. Said collar (95) of the cap is tightly stopped against the collar (160) of the closing seat of the lid, ensuring a perfectly tight closing without any clearance.

In view of the above, while the vehicle is traveling, the lid (104) is perfectly held in closed position by the translating pin (2), preventing water from penetrating from outside inside the recessed seat of the mouthpiece of the fuel tank.

To open the lid (104) it is simply necessary to push the lid (104) towards the translating pin (3). Consequently, the bottom (161) of the closing seat of the lid pushes the head (36) of the translating pin that is additionally retracted with respect to its retracted closing position, additionally compressing the spring (S). Such a retraction of the translating pin unlocks the push-push lock mechanism (M) and the translating pin (3) is free to go to its extracted opening position by means of the expulsion action imposed by the spring (S).

The push-push lock mechanism (M) is described in detail below. The push-push lock mechanism (M) comprises: a rocker arm (4) and a heart-shaped cam (5). The rocker arm (4) is connected to the translating pin (3) and to the heart-shaped cam (5).

The rocker arm (4) comprises a rod (40). A first shank (41) and a second shank (42) protrude from the rod (40) in different directions. The shanks (41, 42) must act as fulcrum of the lever and are substantially disposed at half length of the rod (40) so as to generate a first-class lever. The shanks (41, 42) have an axis (X) that corresponds with the axis of fulcrum of the rocker arm (4).

The box (1) comprises intermediate partitions (11) that stand up from the bottom of the box and are disposed longitudinally in the proximity of a center line of the box. Housings are obtained in the intermediate partitions to revolvingly receive the first shank (41) and the second shank (42) of the rocker arm.

The shanks (41, 42) of the rocker arm are received in the corresponding housings (11, 12) of the box with a clearance in the direction of the axis of the shanks. Spring means (not shown) are disposed in a housing of the partitions of the box and axially stress one of the two shanks (41, 42) of the rocker arm. Said spring means preferably consist in a helical spring. In this way, the rocker arm (4) can rotate around the axis of the shanks and can also translate in the direction of the axis (X) of the shanks.

It must be considered that the translating pin (3) has an axis (Y) and translates in the direction of its axis (Y). Instead, the rocker arm (3) rotates around its axis of fulcrum (X). The axis of fulcrum (X) of the rocker arm is orthogonal to the axis (Y) of the translating pin.

Advantageously, the first shank (41) of the rocker arm has a rounded head (47) and also the housing (11) that receives the first shank is suitably rounded so as to generate a spherical coupling suitable for counterbalancing any type of movement of the rocker arm (4).

Advantageously, the second shank (42) has a recessed housing (48) to receive one end of the spring.

A "U-shaped" fork (43) composed of two arms (44) is provided at a first end of the rod (40). A shank (45) directed towards the interior of the fork is provided at the end of each arm (44). Each shank (45) of the fork has a seat (45') intended to receive the radial pin (38) of the translating pin. In this way the translating pin is firmly connected to the rocker arm.

A follower (46) shaped as a tip protruding from the rod (40) from the same direction as the first shank (41) is provided at a second end of the rod (40) of the rocker arm. The rocker arm (4) has a hole wherein the follower (46) is inserted.

The rocker arm is preferably made of molded aluminum. However, it must be noted that the aluminum molding technology, such as sintering, does not allow for making undercuts. In this case, the rocker arm (4) is made with staggered arms (44) (and consequently also the pins (45) are staggered). No hidden elements are visible in a side view of the rocker arm and this means that there are no undercut elements. This characteristic is important because the part can be molded (mold opening/closing) in the direction of the axis (X) of rotation of the rocker arm.

By molding along such a direction, the part will come out from the mold with the following elements:
the recessed seat of the second shank (42) to receive the spring,
the hole for the pin that forms the follower (46) and
the two pins (45) of the fork.

In view of the above, no additional working operations are necessary.

Although the rocker arm is preferably made of molded aluminum to obtain a high mechanical performance, the rocker arm can also be obtained by molding other zinc alloys (Zamak®) that are less expensive than aluminum or hard plastics to reduce costs.

Moreover, the rocker arm (4) can be made by sintering metal powders in order to obtain a more accurate performance.

The heart-shaped cam (5) is composed of a plate with a central island (57) that defines two adjacent tracks (50; 51) that are suitably joined in such a way to form a heart-shaped closed circuit, wherein the follower (46) of the rocker arm slides along one direction.

The bottom surface of the first track (50) has a set of ascending inclined planes ending in a "U-shaped" seat (52) obtained in the central island (57). The second track (51) provided with a set of descending slides and steps branches off from the seat (52). In view of the above, the follower (46) sliding inside the circuit of the heart-shaped cam moves along a fixed direction because the follower (46) cannot overtake the steps and must always descend along the slides and the steps of the second track (51) and then ascend along the ascending inclined planes of the first track (50).

The heart-shaped cam (5) is disposed in the box (1) in adjacent position to the intermediate partition (11) of the box. The heart-shaped cam (5) is free to make small oscillations to let the follower (46) of the rocker arm travel along the tracks (50, 51) of the heart-shaped cam (5). In fact, the follower (56) makes arc-of-circle curvilinear travels with radius equal to the distance between the follower (56) and the axis (X) of the shanks (41, 42) of the rocker arm.

Therefore the heart-shaped cam (5) must be free to oscillate. To that end, the heart-shaped cam (5) comprises two pivoting pins (55) disposed in opposite directions. The pivoting pins (55) of the heart-shaped cam are revolvingly engaged inside corresponding housings in the box (1). The pivoting pins (55) of the heart-shaped cam have an axis (X1) that is the axis of fulcrum of the heart-shaped cam. The axis of fulcrum (X1) of the heart-shaped cam (5) is parallel to the axis of fulcrum (X) of the rocker arm (4).

It must be noted that, given the fact that the shanks (41, 42) of the rocker arm are housed in the housings of the box with a clearance that lets the shanks (41, 42) translate along the axis (X) of the shanks, the follower (46) of the rocker arm can slide against the ascending planes of the first track (50) of the heart-shaped cam and slidingly descend along the descending planes and the steps of the second track (51) of the heart-shaped cam. The springs means act as counterbalancing and dampening means for the translation of the shanks (41, 42) of the rocker arm along the axis (X).

In view of the above, the rocker arm (4) is totally rigid and does not transmit any transverse stress to the translating pin (3). Moreover, the rocker arm can be made in a single piece by molding a metal material, such as aluminum.

Optionally, the closing device (D) can comprise a safety system that prevents the translating pin (3) from moving. Such a safety system comprises an actuator (A) able to move from a closing position, wherein it interferes with and locks the translating pin (3), to an opening position, wherein it permits the movement of the translating pin (3).

Said actuator (A) comprises an electrical motor (6) that actuates a slide (7) provided with a beak (70) intended to engage the translating pin (3) in order to lock it. The beak (70) engages in a slot (39) of the body of the translating pin.

The electrical motor (6) has a shaft (60) whereon a screw (8) is mounted, having an axis (Z) orthogonal to the axis (Y) of the translating pin and to the axis (X) of fulcrum of the rocker arm. The screw (8) engages in a female screw (71) obtained in the slide (7) to let the slide (7) translate linearly along the axis (Z) of the screw.

Although a specific push-push lock mechanism (M) is shown in the drawings said push-push lock mechanism can have a different structure, such as for example the push-push lock mechanisms disclosed in EP1295748 and in DE102011012699.

We claim:

1. Mouthpiece assembly of a fuel tank for vehicles comprising:
   a box defining a recessed housing wherein a hole is obtained to access a duct leading to the fuel tank of the vehicle,
   a lid hinged to the box in such manner to close the recessed housing of the box, said lid being provided with a closing seat,
   a closing device disposed in the recessed housing of the box of the mouthpiece assembly, said closing device comprising:
      a translating pin translatingly mounted in a box and having an upper portion that cooperates with the closing seat of the lid in such manner to hold the lid in closed position, and
      a push-push lock mechanism connected to the translating pin;
      a cap made of a soft elastic material disposed above said upper portion of the translating pin to provide tightness with the closing seat of the lid;
   wherein said upper part of the translating pin comprises a plurality of longitudinal tabs that are elastically flexible outwards in such manner to deform said cap, forming a collar that protrudes outwards and is engaged tightly inside said seat of the lid of the fuel tank in order to hold the lid of the fuel tank in closed position.

2. The mouthpiece assembly of claim 1, wherein said longitudinal tabs of the stem have a retention tooth that protrudes outwards and forms said collar of the cap when the longitudinal tabs are bent outwards.

3. The mouthpiece assembly of claim 1, wherein said translating pin has an internally hollow tubular shape comprising an axial channel and is slidingly mounted on a shank fixed to said box of the closing device.

4. The mouthpiece assembly of claim 3, wherein
   said closing device comprises a stem that stands up from said shank of the box of the closing device and is disposed inside said axial channel of the translating pin, said stem having a tapered upper part, and
   said longitudinal tabs of the translating pin have a tapered internal surface that cooperates with the tapered upper part of the stem in such manner to elastically bend outwards.

5. The mouthpiece assembly of claim 1, wherein each longitudinal tab has an upper portion with a thickness higher than the lower portion.

6. The mouthpiece assembly of claim 2, wherein
   said shank of the box of the closing device and said axial channel of the translating pin are shaped in such way to prevent the translating pin from rotating with respect to the shank and/or
   said closing device comprising a cover disposed on the box, said cover being provided with a hole from which said translating pin comes out, said hole of the cover and said translating pin being shaped in such way to prevent the translating pin from rotating with respect to the cover.

7. The mouthpiece assembly of claim 1, wherein said cap comprises a bellows-shaped lower portion and a cylindrical upper portion.

8. The mouthpiece assembly of claim 1, wherein said closing seat of the lid of the fuel tank is provided with a collar that protrudes inwards to cooperate with the collar that protrudes towards the outside of the cap.

9. The mouthpiece assembly of claim 1, wherein said push-push lock mechanism comprises:
   an ejection spring that pushes said translating pin,
   a heart-shaped cam pivoted in said box, said heart-shaped cam being provided with tracks forming a substantially heart-shaped closed circuit, and
   a rocker arm pivoted in said box with a pivoting axis orthogonal to the axis of the translating pin, said rocker arm being provided with a fork disposed at a first end of the rocker arm that engages with said pin and a follower disposed at a second end of the rocker arm that slides in the tracks of the heart-shaped cam.

10. The mouthpiece assembly of claim 1, also comprising an actuator with an electrical motor that actuates a slide provided with a beak that engages in a slot of said translating pin to lock the translating pin.

* * * * *